United States Patent
Yodogawa

[11] Patent Number: 5,707,583
[45] Date of Patent: Jan. 13, 1998

[54] METHOD FOR PREPARING THE ZINC OXIDE BASE VARISTOR

[75] Inventor: Masatada Yodogawa, Tokyo, Japan

[73] Assignee: TDK Corporation, Tokyo, Japan

[21] Appl. No.: 444,578

[22] Filed: May 19, 1995

[30] Foreign Application Priority Data

May 19, 1994 [JP] Japan ................................. 6-129591

[51] Int. Cl.$^6$ ..................................... C04B 33/32
[52] U.S. Cl. ........................... 264/617; 264/662
[58] Field of Search ................... 264/61, 65, 66, 264/617, 662

[56] References Cited

U.S. PATENT DOCUMENTS

| | | | |
|---|---|---|---|
| 4,046,847 | 9/1977 | Kresge | 264/61 |
| 4,077,915 | 3/1978 | Yodogawa et al. | 252/521 |
| 4,160,748 | 7/1979 | Yodogawa et al. | 252/518 |
| 4,254,070 | 3/1981 | Yodogawa et al. | 264/61 |
| 4,320,379 | 3/1982 | Yodogawa | 338/21 |
| 4,474,718 | 10/1984 | Mattox et al. | 264/61 |
| 4,959,262 | 9/1990 | Charles et al. | 428/329 |
| 5,037,594 | 8/1991 | Radford et al. | 264/66 |
| 5,248,452 | 9/1993 | Imai et al. | 252/518 |

FOREIGN PATENT DOCUMENTS

| | | |
|---|---|---|
| 54-36594 | 3/1979 | Japan . |
| 2-219203 | 8/1990 | Japan . |
| 5-74608 | 3/1993 | Japan . |

*Primary Examiner*—Christopher A. Fiorilla
*Attorney, Agent, or Firm*—Oblon, Spivak, McClelland, Maier & Neustadt, P.C.

[57] ABSTRACT

In preparing a zinc oxide base varistor in the form of a sintered body which itself has a voltage-dependent nonlinear resistance, firing is done in an atmosphere containing at least 60% of oxygen at or above the temperature at which additives form a liquid phase, and thereafter the sintered body is heat treated in an atmosphere containing at least 10% of oxygen at a temperature of 600° to 1,000° C. There is obtained a zinc oxide base varistor having a high energy handling capability, a high nonlinearity index α, and satisfactory load life characteristics such as a humid load life.

33 Claims, No Drawings

METHOD FOR PREPARING THE ZINC OXIDE BASE VARISTOR

BACKGROUND OF THE INVENTION

1. Technical Field

This invention relates to a method for preparing a zinc oxide base varistor.

2. Background Art

With the recent rapid advance of semiconductor devices and circuits including thyristors, transistors and integrated circuits as well as their reaction, the use of semiconductor devices and circuits in measurement, control and communication equipment and power equipment becomes widespread, promoting the size reduction and performance improvement of these equipment. On the contrary to such advances, these equipment and parts used therein are not fully satisfactory in withstand voltage, surge resistance, and noise resistance. It is then a very important task to protect such equipment and parts from abnormal surge and noise or to stabilize circuit voltage. To overcome these tasks, there is a demand for the development of a voltage-dependent nonlinear resistance ceramic composition which has significant voltage nonlinearity, great discharge withstand current rating and good lifetime property, and is inexpensive.

To this end, varistors containing silicon carbide (SiC), selenium (Se), silicon (Si) or ZnO as a base component have been utilized. Inter alia, varistors based on ZnO are generally characterized by a low clamping voltage and a high voltage-dependent nonlinearity index. Since the zinc oxide varistors are thus suitable for protecting against overvoltage those equipment constructed by semi-conductor and similar devices having a low overcurrent handling capability, they have been widely used instead of varistors based on SiC.

Meanwhile, automobile mounted electronic equipment receive a supply voltage as low as 12 or 16 volts and consequently, varistors having a varistor voltage as low as 24 to 47 volts are used for the protection of the electronic equipment. Since the automobile has a generator and distributor mounted thereon, a surge of great energy can occur. In particular, if the battery is disconnected during operation of the generator, a surge having great energy in excess of several tens of Joule can occur, causing a failure of the mounted electronic equipment. For this reason, the varistors used for protecting electronic equipment, especially in automobiles must have a significantly high energy handling capability. The energy handling capability is defined as follows. While square wave pulses of a given voltage are applied across a varistor sample and this application of voltage pulses is repeated at intervals of a few minutes while increasing the magnitude of voltage, the varistor voltage gradually varies. The energy (applied voltage x current x applied time, unit: Joule) applied across the sample when a percent change of varistor voltage reaches $-10\%$ ($\Delta V_{1mA}/V_{1mA} \times 100\% = -10\%$) is the energy handling capability.

However, since the varistor voltage of zinc oxide varistors increases in proportion to the number of grain boundaries in the direction of applied voltage, low voltage varistors generally have a lower number of grains and a reduced thickness. The reduced thickness leads to a reduced volume and hence, a reduced thermal capacity. Since the energy handling capability of varistors is proportional to the thermal capacity thereof, the low voltage varistors generally have a low energy handling capability.

Then one prior art approach for providing low voltage varistors with a high energy handling capacity is by growing grains to a size as large as several tens of micrometers or more to provide a larger volume and hence, a higher thermal capacity despite a reduced number of grains.

For growing grains of zinc oxide varistors to a size as large as several tens of micrometers or more, it was previously proposed to carry out firing in an oxidizing atmosphere containing at least 40% of oxygen as disclosed in JP-A 219203/1990 and 74608/1993.

However, the method of firing in an oxidizing atmosphere containing at least 40% of oxygen has the drawback that according to the experiment the inventors of the present invention made, zinc oxide varistors as fired at 80% oxygen, for example, have a mean grain size of several tens of micrometers and hence an increased energy handling capability, but a nonlinearity index $\alpha$ of less than 20, which leads to increased leakage current upon voltage application, degrading load life characteristics such as a humid load life.

DISCLOSURE OF THE INVENTION

Therefore, a primary object of the present invention is to provide a method for preparing a zinc oxide base varistor having a high energy handling capability, a high nonlinearity index $\alpha$, and satisfactory load life characteristics such as a humid load life.

This and other objects are achieved by the present invention which is defined below as (1) to (7).

(1) A method for preparing a zinc oxide base varistor in the form of a sintered body having a voltage-dependent nonlinear resistance, comprising the steps of firing in an atmosphere containing at least 60% of oxygen at or above the temperature at which additives form a liquid phase, and heat treating the thus sintered body in an atmosphere containing at least 10% of oxygen at a temperature of 600° to 1,000° C.

(2) A method for preparing a zinc oxide base varistor according to (1) wherein the firing temperature ranges from 1,150° C. to 1,500° C.

(3) A method for preparing a zinc oxide base varistor according to (1) wherein said zinc oxide base varistor contains zinc oxide and as additives, at least one rare earth element, cobalt, and at least one element selected from the group consisting of B, Al, Ga and In.

(4) A method for preparing a zinc oxide base varistor according to (3) wherein said zinc oxide base varistor further contains Si as an additive.

(5) A method for preparing a zinc oxide base varistor according to (3) wherein said zinc oxide base varistor further contains Cr as an additive.

(6) A method for preparing a zinc oxide base varistor according to (3) wherein said zinc oxide base varistor further contains at least one element selected from the group consisting of K, Rb and Cs as an additive.

(7) A method for preparing a zinc oxide base varistor according to (3) wherein said zinc oxide base varistor further contains at least one element selected from the group consisting of Mg, Ca, Sr and Ba as an additive.

FUNCTION AND ADVANTAGES

While the preparation method of the invention carries out firing at a temperature which is equal to or higher than the temperature at which additives form a liquid phase and in an atmosphere containing at least 60% of oxygen, additives such as rare earth elements form reaction products to generate a liquid phase to thereby promote liquid phase sintering and the high oxygen partial pressure promotes grain growth. Due to this size increase of zinc oxide grains, the zinc oxide base varistor according to the invention has a large volume, but a smaller number of grains in the direction of applied voltage. Accordingly, the zinc oxide base varistor according to the invention has a high energy handling capability despite a low varistor voltage. Additionally, by virtue of the subsequent heat treatment of the sintered body in an atmosphere containing at least 10% of oxygen at a temperature of 600° to 1,000° C., the zinc oxide base varistor according to the invention has a high nonlinearity index $\alpha$ and satisfactory reliability such as load life.

ILLUSTRATIVE CONSTRUCTION

The zinc oxide base varistor according to the present invention contains zinc oxide as a base component. It preferably contains as additives, at least one rare earth element selected from the group consisting of La (lanthanum), Ce (cerium), Pr (praseodymium), Nd (neodymium), Sm (samarium), Eu (europium), Gd (gadolinium), Tb (terbium), Dy (dysprosium), Ho (holmium), Er (erbium), Tm (thulium), Yb (ytterbium), and Lu (lutetium); Co (cobalt); and at least one Group IIIb element selected from the group consisting of B (boron), Al (aluminum), Ga (gallium) and In (indium).

The content of zinc oxide is preferably at least 80 at %, more preferably 85 to 99 at % calculated as Zn of the metal or metalloid elements. With less contents of Zn, degradation is likely to occur in a load life test in a hot humid atmosphere.

The amount of the rare earth element added is desirably up to 5 at %, especially 0.02 to 5 at %. Nonlinearity would degrade with a content of less than 0.02 at % whereas the energy handling capability would be low with a content of more than 5 at %.

The amount of Co added is desirably up to 10 at %, especially 0.1 to 10 at %. Nonlinearity would degrade with a content of less than 0.1 at % whereas the energy handling capability would be low with a content of more than 10 at %.

The amount of the Group IIIb element, B, Al, Ga or In added is desirably up to $1 \times 10^{-1}$ at %, especially $1 \times 10^{-4}$ to $1 \times 10^{-1}$ at %. A content of less than $1 \times 10^{-4}$ at % would lead to an increased clamping voltage whereas leakage current would increase with a content of more than $1 \times 10^{-1}$ at %.

In the zinc oxide base varistor of the invention, there may be further added Si. The amount of Si added is desirably in the range of 0.001 to 0.5 at %.

In the zinc oxide base varistor of the invention, there may be further added Cr. The amount of Cr added is desirably in the range of 0.01 to 1 at %.

In the zinc oxide base varistor of the invention, at least one of Group Ia elements, K, Rb and Cs may be further contained in an amount of 0.005 to 1 at %.

In the zinc oxide base varistor of the invention, at least one of Group IIa elements, Mg, Ca, Sr and Ba may be further contained in an amount of 0.005 to 4 at %.

The zinc oxide base varistor of the invention should desirably have a mean grain size of about 25 to 200 µm, a varistor voltage of 6 to 70 V/mm, and an energy handling capability of at least 40 J, especially 50 to 100 J when it takes the form of a disk varistor having a diameter of 14 mm and a thickness of 1 mm. Moreover, the zinc oxide base varistor of the invention should desirably have a rate of change of varistor voltage in a humid load life test of up to 10% (expressed by a percent change of varistor voltage after a voltage corresponding to 90% of the varistor voltage is applied across the sample at a temperature of 60° C. and a relative humidity of 85% for 1,000 hours).

The zinc oxide base varistor of the invention is used in electric and electronic equipment for low voltage operation, especially those to be mounted on automobiles.

Next, the step of firing the zinc oxide base varistor of the invention is described.

In firing the zinc oxide base varistor according to the invention, binder removal is carried out before the firing step. This binder removal is carried out by heat treatment in air at a temperature of 100° to 800° C.

The firing step includes a series of steps consisting of a heating step, a holding step, and a cooling step. The temperature in the holding step is at least equal to the temperature at which additives form a liquid phase. Since the zinc oxide base varistor of the invention preferably contains at least one rare earth element and Co as additives, the holding temperature is preferably set at 1,300° C. or higher, for example, in the range of 1,300° to 1,500° C. with the melting point of reaction products of the additives taken into account. However, in an embodiment wherein silica ($SiO_2$), calcium oxide (CaO), boron oxide ($B_2O_3$) or the like is added, the holding temperature is desirably set in the range of 1,150° to 1,500° C. because addition of such oxide lowers the temperature at which a liquid phase generates. The holding time is generally set in the range of 1 to 10 hours. The atmosphere used in at least the holding step of the firing step has atmospheric pressure and contains at least 60% of oxygen. If the atmosphere contains less than 60% of oxygen, grains of zinc oxide do not grow sufficiently and performance largely varies among samples. A higher oxygen concentration of the atmosphere is desirable, with the best results obtained at 100% oxygen, that is, oxygen atmosphere. The heating rate is generally of the order of 50° to 400° C./hour. An air atmosphere may be used during the entirety or the early half of the heating step where the binder can be burned out.

The firing step is followed by heat treatment. This heat treatment is preferably carried out under atmospheric pressure in an atmosphere containing at least 10%, especially 20 to 50% of oxygen at a temperature of 600° to 1,000° C., especially 700° to 800° C. No satisfactory heat treatment effect is achieved at a treating temperature of lower than 600° C. and an oxygen concentration of less than 10% whereas temperatures in excess of 1,000° C. have the likelihood that elements be reduced at an oxygen concentration of less than 50%.

It is understood that the source materials used herein may be oxides such as ZnO and compounds which convert into oxides upon firing, such as carbonates, oxalates, nitrates and chlorides. The source material ZnO may have a particle size of about 0.1 to 5 µm and the source powders of the additives may have a particle size of about 0.1 to 3 µm.

EXAMPLE

Examples are given below for illustrating the method for preparing a zinc oxide base varistor according to the present invention.

Example 1

Source materials were weighed and blended such that the resulting blend contained 98.419 mol % of ZnO powder as the base component and 0.03 mol % of $Pr_6O_{11}$, 0.03 mol % of $La_2O_3$, 1.5 mol % of CoO, 0.001 mol % of $Al_2O_3$, and 0.02 mol % of SiO$_2$ as additives. Ion-exchanged water was added to the blend which was milled in a ball mill for 16 hours. The entire contents were transferred into a porcelain vat where the powder was dried with hot air. An aqueous solution of PVA as a binder was added to the dried powder which was granulated into granules and dried. The granules were press molded into a disk-shaped compact having a diameter of 17.0 mm and a thickness of 1.2 mm (a density of 3 to 4 g/cm$^3$ as molded). The compact was placed in an electric furnace and heated in air at 400° C. for 2 hours to burn out the PVA. Thereafter, while oxygen was passed through the furnace such that the atmosphere in the furnace had an oxygen concentration as shown in Table 1, the compact was fired at the temperature shown in Table 1 for 2 hours. Sample Nos. 1 to 9 were obtained. The samples were of disk shape having a diameter of 14 mm and a thickness of 1 mm.

Sample Nos. 5 to 9 were further heat treated for 2 hours in an atmosphere having the oxygen concentration shown in Table 1 at the temperature shown in Table 1. These samples, Nos. 1 to 9, were measured for mean grain size, occurrence of a liquid phase, and electric properties.

The mean grain size was measured by polishing a cross section of a sample to mirror finish, taking a photograph through an optical microscope, and effecting measurement on the photograph. The occurrence of a liquid phase was judged by observing a natural surface of a sample under an optical microscope.

The electric properties measured included a varistor voltage (V) per mm, a nonlinearity index α over 1 to 10 mA, an energy handling capability (J) for the above-defined shape, and a rate of change of varistor voltage in a humid load life test. For the measurement of these electric properties, silver electrodes having a diameter of 11.5 mm were baked to opposite surfaces of each sample. A square wave of 20 msec. was used for the measurement of an energy handling capability. The rate of change of varistor voltage in a humid load life test was determined by applying a voltage corresponding to 90% of the varistor voltage across a sample at a temperature of 60° C. and a relative humidity of 85% and measuring a percent change of varistor voltage after 1,000 hours. The nonlinearity index α is given by the following expression:

$$\alpha = \log(10/1)/\log(V_{10mA}/V_{1mA})$$

wherein $V_{10mA}$ and $V_{1mA}$ are varistor voltages at 10 mA and 1 mA, respectively.

As seen from Table 1, sample Nos. 4 to 9 which were fired in a 60% or higher oxygen atmosphere at or above the temperature at which the additives formed a liquid phase had a mean grain size of at least 70 μm, a varistor voltage as low as 15 to 34 V and an energy handling capability of at least 35 J. However, sample No. 4 wherein no heat treatment was done after firing and sample Nos. 5 and 6 wherein heat treatment was done, but under conditions outside the scope of the present invention did not improve as demonstrated by a nonlinearity index α of less than 20 and a rate of change of varistor voltage in a humid load life test of more than 10%.

TABLE 1

| Sample No. | Firing temp. | Firing atmosphere | Heat treating temp. | Heat treating atmosphere | Mean grain size | Varistor voltage | Nonlinearity index α | Energy handling capability | Liquid phase occurrence | Humid load life |
|---|---|---|---|---|---|---|---|---|---|---|
| 1 (comparison) | 1250° C. | 20% oxygen | none | | 10μ | 240 V | 40 | 10 H | one | 2% |
| 2 (comparison) | 1250° C. | 100% oxygen | none | | 12μ | 200 V | 37 | 15 J | none | 2% |
| 3 (comparison) | 1380° C. | 20% oxygen | none | | 30μ | 85 V | 35 | 30 J | occurred | 13% |
| 4 (comparison) | 1380° C. | 100% oxygen | none | | 100μ | 15 V | 16 | 35 J | occurred | 15% |
| 5 (comparison) | 1380° C. | 100% oxygen | 400° C. | 20% oxygen | 100μ | 18 V | 18 | 40 J | occurred | 12% |
| 6 (comparison) | 1380° C. | 100% oxygen | 700° C. | 5% oxygen | 100μ | 14 V | 15 | 42 J | occurred | 11% |
| 7 | 1380° C. | 100% oxygen | 700° C. | 20% oxygen | 100μ | 24 V | 35 | 70 J | occurred | 1% |
| 8 | 1380° C. | 100% oxygen | 1000° C. | 100% oxygen | 100μ | 27 V | 40 | 65 J | occurred | 1% |
| 9 | 1380° C. | 60% oxygen | 700° C. | 20% oxygen | 70μ | 34 V | 38 | 50 J | occurred | 2% |

In contrast, sample Nos. 7 to 9 wherein firing was done under conditions within the scope of the present invention and heat treatment was done after firing improved as demonstrated by a nonlinearity index α of at least 35, an energy handling capability of at least 50 J, and a rate of change of varistor voltage in a humid load life test of up to 2%.

It is noted that a satisfactory energy handling capability as described above was also obtained when rare earth elements other than the above-mentioned Pr and La, such as Ce, Nd, Sm, Eu, Gd, Tb, Dy, Ho, Er, Tm, Yb, and Lu were used as rare earth elements in the form of R$_2$O$_3$ wherein R is a rare earth element. The firing conditions were the same as in sample No. 7 as were in the following runs. A similar tendency as described above was obtained when B, Ga or In was used in the form of M$_2$O$_3$ wherein M is B, Ga or In instead of Al, and when Cr was further added. A similar tendency as described above was obtained when at least one of K, Rb and Cs was added to the composition of Example 1 in the form of M'$_2$O and/or at least one of Mg, Ca, Sr and Ba was added in the form of M"O wherein M" is Mg, Ca, Sr or Ba The results of these runs are shown in Table 2.

TABLE 2

| Sample No. | ZnO | La$_2$O$_3$ | R$_2$O$_3$ | | CoO | M$_2$O$_3$ | | SiO$_2$ | M$_2$O | | Cr$_2$O$_3$ | MO | | Varistor voltage | Non-linearity index α | Energy handling capability | Humid load life |
|---|---|---|---|---|---|---|---|---|---|---|---|---|---|---|---|---|---|
| 10 | bal. | 0.03 | Pr | 0.03 | 1.5 | Al | 0.001 | 0.02 | K | 0.01 | — | — | — | 28 | 38 | 70 J | 1% |
| 11 | bal. | 0.03 | Pr | 0.03 | 1.5 | Al | 0.001 | 0.02 | K | 0.01 | 0.004 | — | — | 32 | 37 | 70 J | 0.5% |
| 12 | bal. | 0.03 | Pr | 0.03 | 1.5 | Al | 0.001 | 0.02 | K | 0.01 | 0.004 | Ca | 0.01 | 30 | 40 | 75 J | 1% |
| 13 | bal. | 0.03 | Pr | 0.03 | 1.5 | Ga | 0.001 | 0.02 | K | 0.01 | 0.004 | Ca | 0.01 | 30 | 41 | 75 J | 1% |
| 14 | bal. | 0.03 | Pr | 0.03 | 1.5 | In | 0.001 | 0.02 | K | 0.01 | 0.004 | Ca | 0.01 | 30 | 42 | 75 J | 1% |
| 15 | bal. | 0 | Nd | 0.06 | 1.5 | Ga | 0.001 | 0.02 | Rb | 0.01 | 0.004 | Ca | 0.01 | 32 | 40 | 75 J | 1% |
| 16 | bal. | 0 | Sm | 0.06 | 1.5 | Ga | 0.001 | 0.02 | Rb | 0.01 | 0.004 | Ca | 0.01 | 34 | 38 | 70 J | 1% |
| 17 | bal. | 0 | Eu | 0.06 | 1.5 | Ga | 0.001 | 0.02 | Rb | 0.01 | 0.004 | Ca | 0.01 | 35 | 36 | 70 J | 1% |
| 18 | bal. | 0 | Gd | 0.06 | 1.5 | Ga | 0.001 | 0.02 | Cs | 0.01 | 0.004 | Sr | 0.01 | 37 | 36 | 65 J | 1% |
| 19 | bal. | 0 | Tb | 0.06 | 1.5 | In | 0.001 | 0.02 | Cs | 0.02 | 0.004 | Sr | 0.01 | 39 | 34 | 65 J | 1% |
| 20 | bal. | 0 | Dy | 0.06 | 1.5 | In | 0.001 | 0.02 | Cs | 0.01 | 0.004 | Sr | 0.01 | 38 | 35 | 65 J | 1% |
| 21 | bal. | 0 | Ho | 0.06 | 1.5 | In | 0.001 | 0.02 | K | 0.01 | 0.004 | Ba | 0.01 | 35 | 33 | 60 J | 1.5% |
| 22 | bal. | 0 | Er | 0.06 | 1.5 | B | 0.001 | 0.02 | K | 0.01 | 0.004 | Ba | 0.01 | 37 | 33 | 60 J | 1.5% |
| 23 | bal. | 0 | Tm | 0.06 | 1.5 | B | 0.001 | 0.02 | I | 0.01 | 0.004 | Ba | 0.01 | 38 | 32 | 55 J | 2% |
| 24 | bal. | 0 | Yb | 0.06 | 1.5 | B | 0.001 | 0.02 | K | 0.01 | 0.004 | Ba | 0.01 | 41 | 31 | 55 J | 2% |
| 25 | bal. | 0 | Lu | 0.06 | 1.5 | B | 0.001 | 0.02 | K | 0.01 | 0.004 | Ba | 0.01 | 42 | 30 | 55 J | 2% |
| 26 | bal. | 0.03 | Pr | 0.03 | 1.5 | Al | 0.001 | 0.02 | K | 0.01 | 0.004 | Mg | 0.01 | 35 | 44 | 70 J | 0.5% |

As described above, zinc oxide base varistors prepared according to the present invention have a high energy handling capability, a high nonlinearity index α, and satisfactory load life characteristics such as a rate of change of varistor voltage in a humid load life test regardless of a low varistor voltage.

I claim:

1. A method for preparing a zinc oxide based varistor in the form of a sintered body, comprising:
    firing a composition in an atmosphere comprising at least 60 vol. % oxygen, thereby forming a liquid phase to obtain a sintered body; followed by
    heat treating said sintered body in an atmosphere comprising at least 10 vol. % oxygen, at a temperature of 600°–1000° C.;
    wherein said composition comprises zinc, at least one rare earth element, cobalt, Si and at least one element selected from the group consisting of B, Al, Ga and In, and said zinc and said at least one rare earth element are present as oxides, or compounds which convert into oxides upon said firing.

2. The method of claim 1, wherein said at least one rare earth element is present in an amount of 0.02–5 at. %.

3. The method of claim 1, wherein said composition further comprises cobalt in amount of 0.01–10 at. %.

4. The method of claim 1, wherein said composition further comprises at least one element selected from the group consisting of B, Al, Ga and In, in an amount of 1×10$^{-4}$ to 1×10$^{-1}$ at. %.

5. The method of claim 1, wherein said composition further comprises Si in an amount of 0.001–0.5 at. %.

6. The method of claim 1, wherein said heating is carried out in an atmosphere comprising 20–50 vol. % oxygen.

7. The method of claim 1, wherein said heating is carried out at a temperature of from 700°–800° C.

8. The method of claim 1, wherein said composition further comprises:
    0.1–10 at. % cobalt;
    1×10$^{-4}$ to 1×10$^{-1}$ at. % of at least one element selected from the group consisting of Ba, Al, Ga and In;
    0.001–0.5 at. % of Si; and
    0.01–1 at. % of Cr.

9. The method of claim 1, wherein the firing step is performed at a temperature of from 1150° C. to 1500° C.

10. A method for preparing a zinc oxide based varistor in the form of a sintered body, comprising:
    firing a composition in an atmosphere comprising at least 60 vol. % oxygen, thereby forming a liquid phase to obtain a sintered body; followed by
    heat treating said sintered body in an atmosphere comprising at least 10 vol. % oxygen, at a temperature of 600°–1000° C.;
    wherein said composition comprises zinc, at least one rare earth element, cobalt, Cr and at least one element selected from the group consisting or B, Al, Ga and In, and said zinc and said at least one rare earth element are present as oxides, or compounds which convert into oxides upon said firing.

11. The method of claim 10, wherein said composition further comprises Cr in an amount of 0.01–1 at. %.

12. The method of claim 10, wherein the firing step is performed at a temperature of from 1150° C. to 1500° C.

13. The method of claim 12, wherein said composition further comprises at least one element selected from the group consisting of K, Rb and Cs, present in an amount of 0.005–1 at. %.

14. The method of claim 10, wherein said at least one rare earth element is present in an amount of 0.02–5 at. %.

15. The method of claim 10, wherein said composition further comprises cobalt in amount of 0.01–10 at. %.

16. The method of claim 10, wherein said composition further comprises at least one element selected from the group consisting or B, Al, Ga and In, in an mount of 1×10$^{-4}$ to 1×10$^{-1}$ at. %.

17. The method of claim 10, wherein said heating is carried out in an atmosphere comprising 20–50 vol. % oxygen.

18. The method of claim 17, wherein said heating is carried out at a temperature of from 700°–800° C.

19. A method for preparing a zinc oxide based varistor in the form of a sintered body, comprising:
    firing a composition in an atmosphere comprising at least 60 vol. % oxygen, thereby forming a liquid phase to obtain a sintered body; followed by
    heat treating said sintered body in an atmosphere comprising at least 10 vol. % oxygen, at a temperature of 600°–1000 ° C.;
    wherein said composition comprises zinc, at least one rare earth element, cobalt, at least one element selected from the group consisting of K, Rb and Cs, and at least one element selected from the group consisting or B, Al, Ga and In, and said zinc and said at least one rare earth element are present as oxides, or compounds which convert into oxides upon said firing.

20. The method of claim 19, wherein said composition further comprises at least on element selected from the group consisting of Mg, Ca, Sr and Ba, in an amount of 0.005–4 at. %.

21. The method of claim 19, wherein the firing step is performed at a temperature of from 1150° C. to 1500° C.

22. The method of claim 19, wherein said at least one rare earth element is present in an amount of 0.02–5 at. %.

23. The method of claim 19, wherein said composition further comprises cobalt in amount of 0.01–10 at. %.

24. The method of claim 19, wherein said composition further comprises at least one element selected from the group consisting or B, Al, Ga and In, in an mount of $1\times10^{-4}$ to $1\times10^{-1}$ at. %.

25. The method of claim 19, wherein said heating is carried out in an atmosphere comprising 20–50 vol. % oxygen.

26. The method of claim 25, wherein said heating is carried out at a temperature of from 700°–800° C.

27. A method for preparing a zinc oxide based varistor in the form of a sintered body, comprising:

firing a composition in an atmosphere comprising at least 60 vol. % oxygen, thereby forming a liquid phase to obtain a sintered body; followed by heat treating said sintered body in an atmosphere comprising at least 10 vol. % oxygen, at a temperature of 600°–1000° C.;

wherein said composition comprises zinc, at least one rare earth element, cobalt, at least one element selected from the group consisting of Mg, Ca, Sr and Ba, and at least one element selected from the group consisting of B, Al, Ga and In, and said zinc and said at least one rare earth element are present as oxides, or compounds which convert into oxides upon said firing.

28. The method of claim 27, wherein the firing step is performed at a temperature of from 1150° C. to 1500° C.

29. The method of claim 27, wherein said at least one rare earth element is present in an amount of 0.02–5 at. %.

30. The method of claim 27, wherein said composition further comprises cobalt in amount of 0.01–10 at. %.

31. The method of claim 22, wherein said composition further comprises at least one element selected from the group consisting of B, Al, Ga and In, in an amount of $1\times10^{-4}$ to $1\times10^{-1}$ at. %.

32. The method of claim 27, wherein said heating is carried out in an atmosphere comprising 20–50 vol. % oxygen.

33. The method of claim 32, wherein said heating is carried out at a temperature of from 700°–800° C.

* * * * *

UNITED STATES PATENT AND TRADEMARK OFFICE
CERTIFICATE OF CORRECTION

PATENT NO. : 5,707,583
DATED : JANUARY 13, 1998
INVENTOR(S) : MASATADA YODOGAWA

It is certified that error appears in the above-identified patent and that said Letters Patent is hereby corrected as shown below:

Page 1, Delete Title in its entirety and insert:

--METHOD FOR PREPARING ZINC OXIDE BASE VARISTOR--.

Column 7, Claim 8, line 63, "Ba,"

should read --B,--.

Column 8, Claim 10, line 33, "consisting or B,"

should read --consisting of B,--.

Column 8, Claim 16, line 51, "consisting or B, Al, Ga and In, in an mount"

should read --consisting of B, Al, Ga and In, in an amount--.

Column 9, Claim 19, line 2, "consisting or B,"

should read --consisting of B,--.

UNITED STATES PATENT AND TRADEMARK OFFICE
CERTIFICATE OF CORRECTION

PATENT NO. : 5,707,583
DATED : JANUARY 13, 1998
INVENTOR(S) : MASATADA YODOGAWA

It is certified that error appears in the above-identified patent and that said Letters Patent is hereby corrected as shown below:

Column 9, Claim 20, line 7, "least on element"

should read --least one element--.

Column 9, Claim 24, line 18, "consisting or B, Al, Ga and In, in an mount"

should read --consisting of B, Al, Ga and In, in an amount--.

Signed and Sealed this

Thirtieth Day of June, 1998

BRUCE LEHMAN

*Attest:*

*Attesting Officer*      *Commissioner of Patents and Trademarks*